United States Patent
Hiss et al.

(10) Patent No.: US 8,550,411 B2
(45) Date of Patent: Oct. 8, 2013

(54) CLAMP FOR SECURING COMPONENTS

(75) Inventors: Helmut Hiss, Ispringen (DE); Jochen Caspari, St. Wendel (DE)

(73) Assignee: Hydac Accessories GmbH, Sulzbach/Saar (DE)

( * ) Notice: Subject to any disclaimer, the term of this patent is extended or adjusted under 35 U.S.C. 154(b) by 187 days.

(21) Appl. No.: 12/805,391

(22) Filed: Jul. 28, 2010

(65) Prior Publication Data

US 2012/0006948 A1    Jan. 12, 2012

(30) Foreign Application Priority Data

Jul. 8, 2010  (DE) .......................... 10 2010 026 596

(51) Int. Cl.
*F16L 3/08*   (2006.01)

(52) U.S. Cl.
USPC .................... 248/65; 269/3; 269/6; 248/230.5

(58) Field of Classification Search
USPC ............... 248/65, 70, 74.1, 75, 230.5, 230.6, 248/231.61, 231.71; 269/3, 6, 95, 143; 24/16 R, 279, 284
See application file for complete search history.

(56) References Cited

U.S. PATENT DOCUMENTS

| | | | | |
|---|---|---|---|---|
| 3,553,094 A | * | 1/1971 | Scott, Jr. et al. | 204/196.16 |
| 3,594,706 A | * | 7/1971 | Sotolongo | 439/520 |
| 3,803,012 A | * | 4/1974 | Kurr | 204/196.16 |
| 4,872,860 A | * | 10/1989 | Meisenburg | 440/113 |
| 5,794,897 A | * | 8/1998 | Jobin et al. | 248/74.4 |
| 6,417,451 B1 | * | 7/2002 | Uchiyama | 174/72 A |
| 2010/0192334 A1 | * | 8/2010 | Reichle et al. | 24/457 |

FOREIGN PATENT DOCUMENTS

DE    20 2009 007 263    9/2009

* cited by examiner

*Primary Examiner* — Alfred J Wujciak
(74) *Attorney, Agent, or Firm* — Roylance, Abrams, Berdo and Goodman LLP

(57) ABSTRACT

A clamp for securing components, in particular string-like or linear structural members, like pipelines, hoses, or cables, has at least one clamp part (3). The clamp part outer contour (4) delimits at least partially a receiving space (5) for receiving the component. The one clamp part (3) has a mechanism (6) for minimizing corrosion, in particular, crevice corrosion, at every component that is held. The mechanism has at least one sacrificial element (7) that is visibly consumed with the onset of corrosion and continued duration of use of the clamp fastener. The respective sacrificial element (7) is placed, as an independent component, on the outer contour (4) of the clamp part (3).

33 Claims, 3 Drawing Sheets

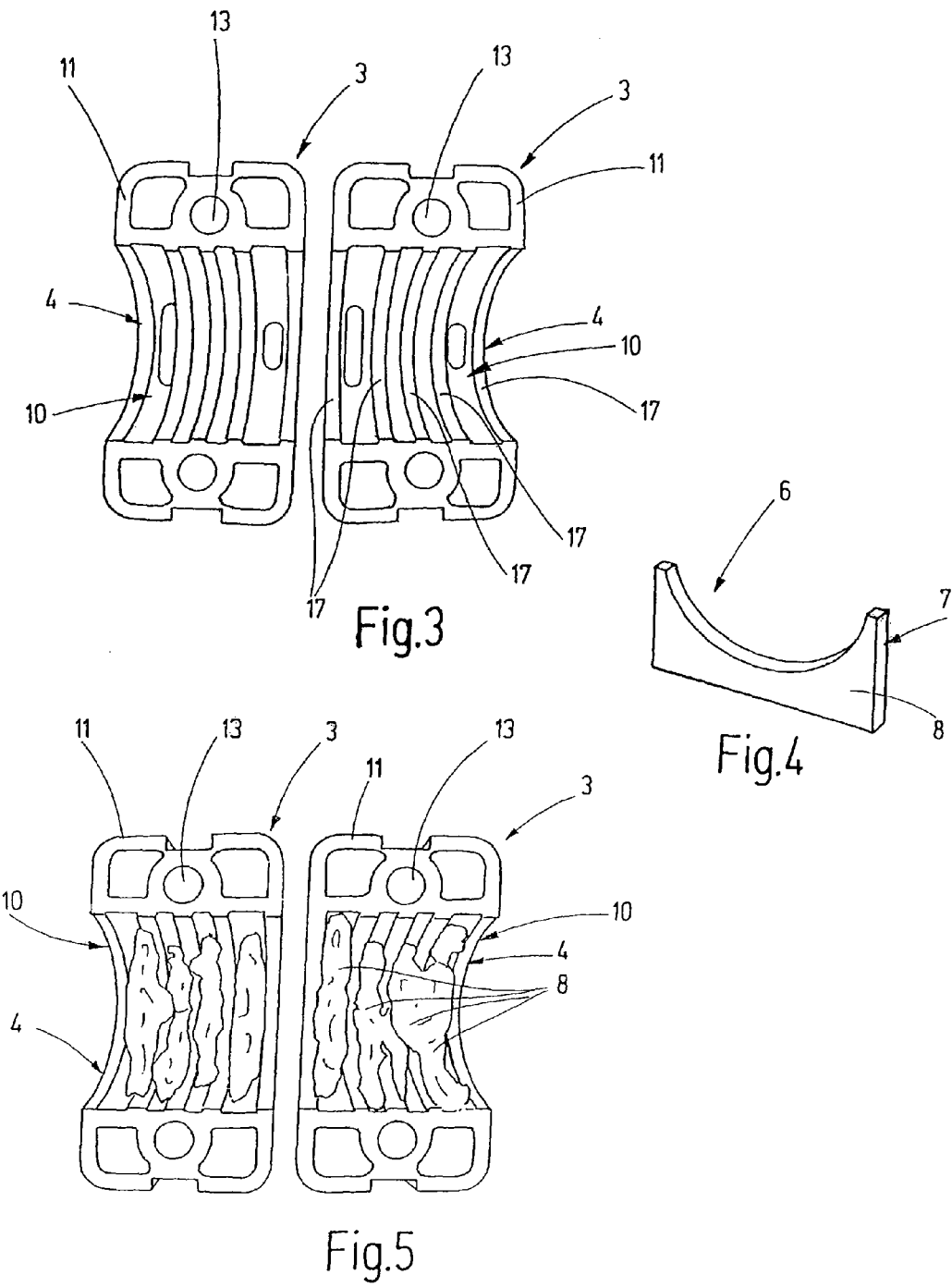

CLAMP FOR SECURING COMPONENTS

FIELD OF THE INVENTION

The invention relates to a clamp for securing components, in particular string-shaped structural members, e.g., pipelines, hoses, or cables, having at least one clamp part. The clamp outer contour delimits at least partially a receiving space for receiving the respective component. At least one clamp part has a mechanism for minimizing corrosion, in particular, crevice corrosion, at every component that is held.

BACKGROUND OF THE INVENTION

In electrical or hydraulic systems, hoses or cables as well as hydraulic lines are connected to system components. The static or dynamic loads (vibrations) can cause damage to the pertinent string-shaped components. In addition, for the sake of a better overview with respect to the interconnection, the hoses, pipelines, and the like should be laid more systematically along commensurate system components. Therefore, the prior art connects the indicated cables and lines by clamps used as spacers and instrumental in securing the position thereof.

Such clamps have, as a rule, mechanisms for securing the same to tertiary components, for example, in the form of passage points spatially separated from each other and provided for the penetration of fastening elements, e.g. screws and the like. In the course of securing linear elements, for example, in the form of hoses or cables, the clamp parts encircle individually or in their entirety these hoses or cables at least partially or along their entire circumference. At the same time, the typically linear element that is to be secured is essentially fixed in position inside the clamp by positive locking with the clamp parts. In addition to the indicated passage points for the fastening elements, GB 1 224 535 A describes, as an additional alternative embodiment, a clamp, on which is mounted a locking mechanism, by which the clamp bodies in close proximity to each other can be secured to one another in a clamping manner, while simultaneously receiving the linear element.

Especially when clamps are used in a corrosive environment, for example, when they are used in electrical or hydraulic systems in the offshore area, the linear elements to be fixed in position, like the stainless steel pipes, may corrode even with the use of plastic clamps, used to secure the stainless steel pipes, because of the environmental influences, like salt air and the like. Hence, the result is typically crevice corrosion at the metal parts in the presence of a corrosive medium in unsealed support crevices, for example, affixed cross pieces formed by overlappings, and welds at joining points with no root penetration. In this case, the driving force for the crevice corrosion is the concentration differential between the actual crevice and the "outer crevice area" of the corrosive medium. The result of the indicated concentration differential is a potential difference leading to electrochemical corrosion inside the crevice or in the area of the environment of the crevice. Even CrNi steels that otherwise do not rust can corrode in the indicated crevices when these crevices do not have a medium, like oxygen, to form a protective oxide layer or when this oxide layer cannot form owing to the mechanical stress.

Furthermore, the prior art describes clamps and clamp parts that have a mechanism for minimizing corrosion with the mechanism being an inhibitor introduced into the synthetic plastic material of the pertinent clamp part. For example, the inhibitor, comprising ethanolamine and sulfolane, can be introduced, as the carrier, into the synthetic plastic material from the outside pressure impregnation. Furthermore, the pressure impregnation can also be carried out from the outside with a gas field inhibitor (naphthenic acid derivative). Another possibility of using corrosion inhibitors without a crevice area involves coating the flat interior and exterior surfaces of the clamp with organic coatings that contain microcapsules and that penetrate correspondingly into the surface of the clamp material.

SUMMARY OF THE INVENTION

An object of the invention is to provide a clamp able to effectively inhibit corrosion and, in particular, crevice corrosion between it and the linear component that is to be held.

The invention achieves this engineering object by a clamp basically having a mechanism for minimizing corrosion such that the mechanism has at least one sacrificial element as an independent component that is gradually consumed specifically due to electrolytic removal of the material when corrosion conditions begin to act on the clamp. In this case, the sacrificial element is placed on the outer contour of a clamp part. The inventive effect of the clamp has been proved in extensive scientific studies. Surprising to the average person skilled in the art of this field of fastening technology, one can dispense with the expensive inhibitor solutions if a sacrificial element arrangement is used that is relatively easy to obtain. An anti-corrosion protection is achieved that is significantly better than that of the known solutions described above.

Therefore, the invention provides a clamp that permanently prevents the material from being corroded and inhibits a progressive weakening of the material of every component that is to be secured with the clamp. The system that is the tertiary component and that is fitted with the clamps according to the invention is permanently protected against operating impairments or failure due to the corrosive attack on its string-shaped components, e.g., pipelines, cables, and the like. A high operating reliability of the system is also made possible by the clamp according to the invention.

A preferred embodiment of the clamp provides the sacrificial element configured in the form of an electrode, such as a sacrificial anode. The sacrificial anode enables an electron flow in the direction of the linear structural member or component secured with the clamp. The linear structural member or component itself does not undergo a removal of material under the corrosive influences of a corresponding environment.

In an especially preferred embodiment of the clamp, at least one part of the clamp has a cup-shaped depression, on which the sacrificial element of the invention is placed to conform to the contour of the depression and the contour of the structural member secured. It may also be advantageous to provide a part of the clamp or the whole clamp with chamber-like cutout areas as part of the outer contour of the clamp. The respective sacrificial element can be inserted, preferably with a predefinable projecting length, into this cutout area. The sacrificial element then can also be placed, as an independent component, on the contour of the assignable clamp part. In this way the sacrificial element can be inserted segment by segment and optionally without adhesive inside the clamp—a feature that is very assembly friendly—before the start of the actual assembly of the clamp at the structural member to be held. The clamp and every sacrificial element inserted form together a structural unit suitable for immediate use at the intended installation site.

In an especially preferred embodiment, the sacrificial element conforms to the cup-shape of the clamp part and does not project beyond the edges of the cup-shaped depression of the clamp, thus saving installation space.

For the purpose of resting as flush as possible with the linear structural member secured, the sacrificial element is constructed from a sheet-shaped or plate-shaped flat blank, forming, upon being molded into shape, a cup-shaped contour secured without tension in the corresponding contour of the clamp. The sacrificial element preferably may have magnesium and/or zinc constituents and is formed preferably in its entirety of one of these non-ferrous metals.

The sacrificial element preferably totally lines the cup-shaped depression in the clamp. The sacrificial element can be connected to the clamp by an adhesive bond, preferably with the use of a hot melt adhesive. Furthermore, providing a positive locking connection in the form of a clip connection between the sacrificial element and the clamp may be advantageous. As a result, the clamp forms a ready-to-assemble functional unit comprising a clamp body and sacrificial element.

The clamp preferably comprises two semi-cup-shaped identical components. In one especially preferred embodiment, the two identical components forming the clamp are configured to form block-like clamping parts delimiting a receiving space, preferably in the shape of a cylinder. These clamping parts form a radial crevice between themselves and the component to be held and receiving the plate-shaped sacrificial element as the independent component. Each clamping part may also have two sacrificial elements that are of the same size and that completely encircle or encompass the clamp and the structural member to be secured along its circumference when the clamp and structural member are in the assembled state. In this respect, the block-like clamping parts can have passage points for receiving their fastening elements, such as hollow-type rivets, screws, for securing the same to tertiary components, such as system components and the like.

Other objects, advantages and salient features of the present invention will become apparent from the following detailed description, which, taken in conjunction with the annexed drawings, discloses preferred embodiments of the present invention.

BRIEF DESCRIPTION OF THE DRAWINGS

Referring to the drawings which form a part of this disclosure and which are schematic and not to scale:

FIG. 3 is a plan view of clamp parts according to a second exemplary embodiment of the invention without the sacrificial elements;

FIG. 4 is a perspective view of an exemplary embodiment of a sacrificial element for the clamp parts of FIG. 3; and FIG. 5 is a top view of two clamp parts of FIG. 3 with the installed sacrificial elements after being exposed to corrosive environmental conditions over a prolonged period of time.

DETAILED DESCRIPTION OF THE INVENTION

Figure 1A:
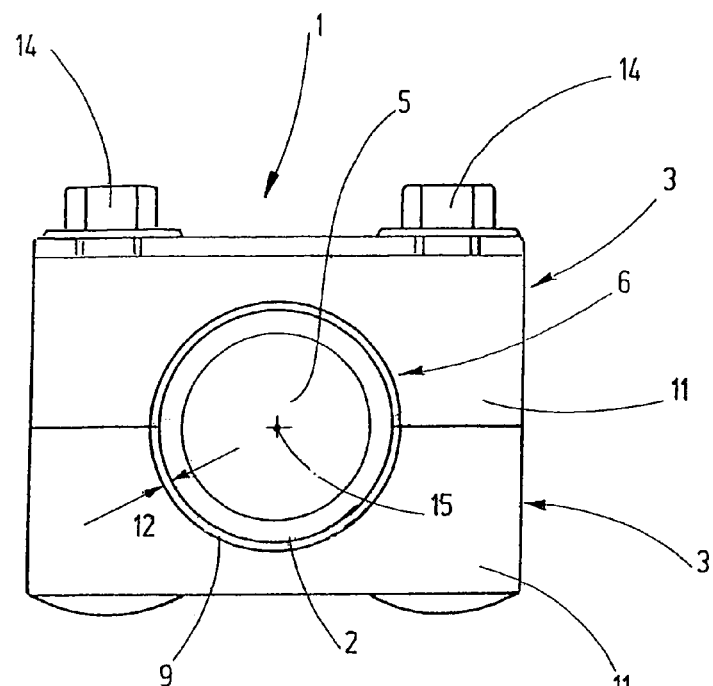
FIG. 1a is a front elevational view of a clamp in the assembled state according to a first exemplary embodiment of the invention.
Figure 2:
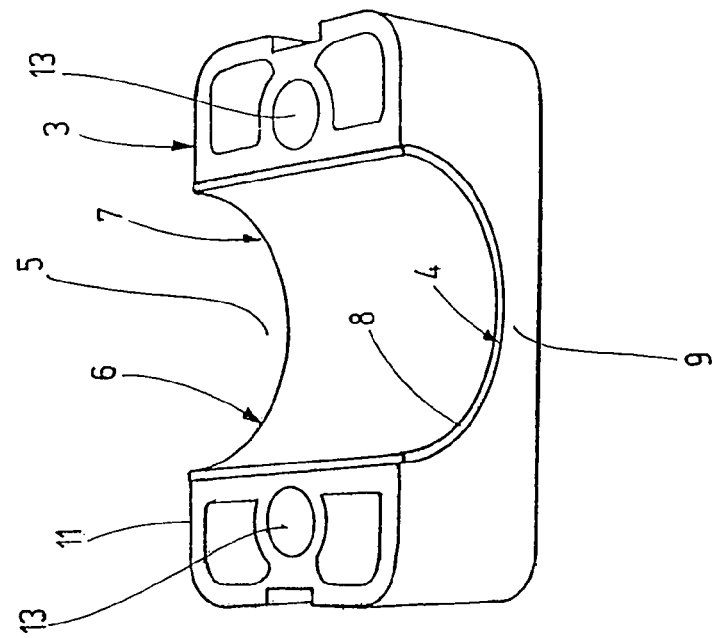
FIG. 2 is a perspective view of two clamp parts of FIG. 1a that are configured as identical components.
Figure 2:
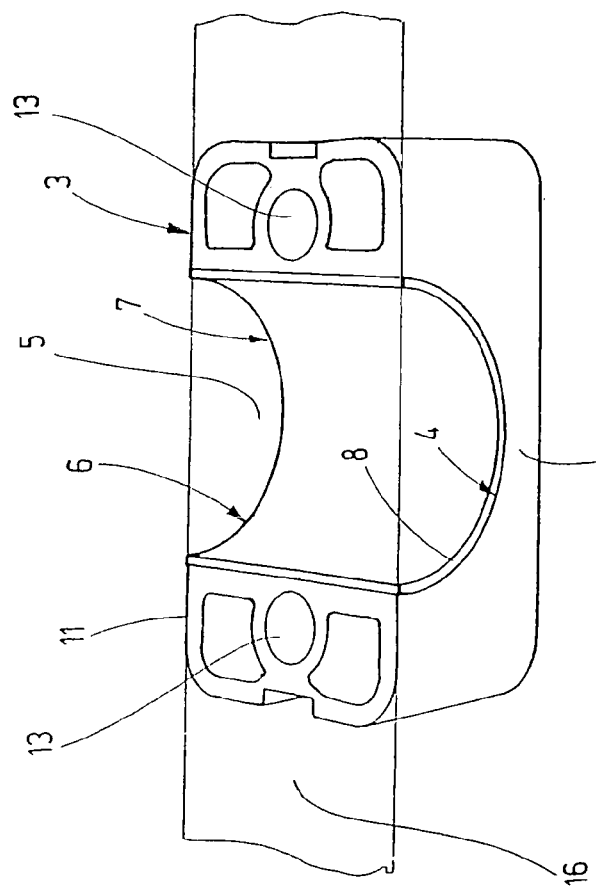

FIG. 1a is a schematic view (not drawn to scale) of an inventive clamp 1 shown in the closed state and intended for securing a structural member 2 constructed as a CrNi steel pipe and a component of a hydraulic offshore system. The clamp 1 consists essentially of injection molded clamp parts 3, made of a thermoplastic material, in this case in the form of a polypropylene plastic. The clamp parts 3 are configured, as also shown in FIG. 2, as identical components having an essentially rectangular outer plan form. Thus, the overall form of the clamp 1 is cuboid. In this case FIG. 1a shows that a receiving space 5 in the form of a hollow cylinder is formed by the two assembled clamp parts 3. When the clamp 1 is in the divided state, as shown in FIG. 1a, the receiving space 5 for the structural member 2 to be secured is formed by a semi-cylindrically shaped part or a cup-shaped depression 9 in each clamp part 3. The cup-shaped depressions 9 are configured to be symmetrical relative to a longitudinal axis 15 of the clamp 1. They could also be configured to be asymmetrical to each other and/or to have different diameters. Each clamp part 3 forms, as also shown in FIGS. 3 and 5 in an additional embodiment for the clamp 1, a block with an imaginary parting plane 16 interrupted, as stated above, by the semi-cylindrically shaped depressions 9. When the clamp 1 is in the closed state, the depressions 9 in turn form the receiving space 5.

When viewed in the radial direction to the longitudinal axis 15 of the clamp 1, the plastic clamp parts 3 have depressions 9. The radii of the depressions 9 define an overdimension in relation to the diameter D of the structural member 2 to be secured. The embodiments according to FIGS. 1a to 2 show, when viewed in the direction of the structural member 2 to be secured, the total surface area of the outer contour 4 of the depressions 9. The result overall is a crevice between the depressions 9 of the clamp parts 3 and the outside of the linear structural member 2 to be secured. This crevice can be filled with the mechanism 6 for minimizing corrosion, in particular crevice corrosion, at the structural member 2 that is to be secured. In the embodiments according to FIGS. 1a to 2, the resulting mechanism 6 is formed by a metallic sacrificial element 7 in the form of a plate-shaped zinc sacrificial anode 8 inserted into the depressions 9. In so doing, the sacrificial element 7 forms a semi-cup having a constant wall thickness and semicircular cross section for each clamp part 3.

Figure 1B:
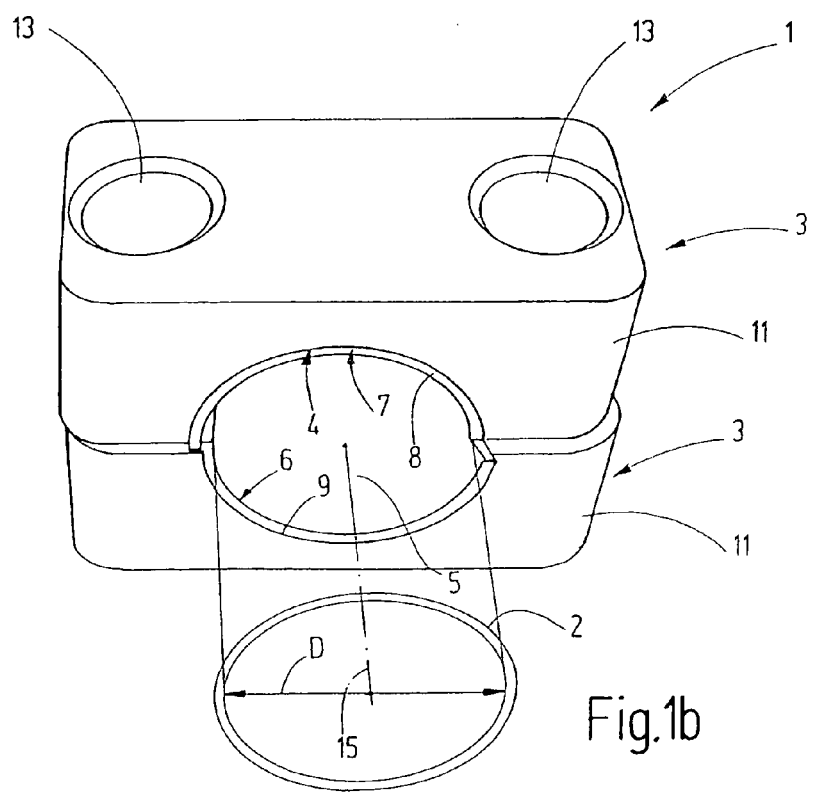
FIG. 1b is a perspective view of the clamp of FIG. 1a without the fastening elements, where for the sake of a better graphical rendering the two clamp parts are not aligned.

In particular, FIGS. 1b and 2 also show that the sacrificial element 7 lies both flush with the outer contour of the clamp 1 and with the imaginary parting plane 16. In the illustrated embodiment, the sacrificial element 7 is secured in a force-locking manner on the respective clamp part 3 with an adhesive, in particular in the form of a hot melt adhesive. As a result, in the assembled state the total surface area of the sacrificial element 7 can lie flush with the structural member 2 to be secured, for example, in the form of a stainless steel pressure medium line of a hydraulic system. In the whole abutting area of the clamp 1 at the structural member 2 to be secured and, in the whole area of the structural member 2 to be secured and exposed to the risk imposed by the effects of crevice corrosion, a sacrificial element 7 can prevent any corrosive wear of the secured structural member 2. Owing to the dimensions of the clamp in relation to the structural member 2 is to be secured, the clamp 1 forms together with the sacrificial element 7 a clamping part 11 for the purpose of holding the structural member 2 to be secured.

For this purpose each clamp part 3 has, when viewed in the radial direction to the longitudinal axis 15, passage points 13, extending between the respective depressions 9 and the radial side faces of each clamp part 3 on both sides and perpendicular to the respective imaginary parting plane 16, for the individual fastening elements 14 of the clamp 1. The passage points 13 are preferably configured as cylindrical boreholes and enable the passage of machine screws preferably provided with a hexagonal head (cf. FIG. 1a). The fastening elements 14 unite the function of the clamping of the string-shaped or linear structural member 2 in the receiving space 5 of the clamp and the fastening of the clamp parts 3 to one another. Furthermore, the fastening elements 14 can be used to fasten the clamp 1 to a tertiary or system component (not shown in detail).

FIG. 3 shows an additional or second advantageous embodiment of the clamp 1 according to the invention. The outer contour 4 in the area of the depressions 9 is configured as a chamber-shaped cutout area 10 on the two illustrated clamp parts 3. The resulting outer contour is fanned out to form a total of five ribs 17, thus reducing the size of the abutting face of the clamp parts 3 on the structural member 2 to be secured. This feature that can result in higher clamping forces as compared to the embodiment having the total surface area shown in FIGS. 1 and 2. The ribs 17 have essentially a constant wall thickness over their entire side projection face. In addition to the increase in clamping force, the possibility exists of sliding disk-shaped sacrificial elements 7, illustrated in FIG. 4, between the chamber-like cutout areas 10. The sacrificial elements in turn can be placed on the outer contour of the assignable clamp part 3. As a result, the sacrificial elements 7 can rest in the form of a strip against the structural member 2 that is to be secured. The ribs 17 have the same free side face form as the disk-shaped sacrificial element 7 shown as a perspective view in FIG. 4. The disk-shaped sacrificial elements 7 have, when viewed over their entire side face, a constant material thickness. The material thickness of these sacrificial elements 7 is chosen specifically so that they can be slid into the chamber-like cutout areas 10 of the clamp 1 with a defined prestress to be secured in the chamber-like cutout areas 10 so as to be loss-proof. These sacrificial elements can be replaced after a defined amount of material has been removed on their frontal face that faces the structural member 2 to be secured with the clamp 1. In so doing, the clamp 1 itself can remain intact. In this context, FIG. 5 shows the visual state of the sacrificial elements 7 following a corrosive attack over a prolonged period of use. The material exchange of the sacrificial element 7 with the aggressive electrolytes causes a surface expansion of the active surface of the sacrificial elements 7 with the structural member 2 to be secured, for example, in the form of a stainless steel pipe.

Instead of a subsequent introduction of the sacrificial elements 7 into the respective clamp part 3 by pressing or gluing the sacrificial elements 7 into the chamber-like cutout areas 10, another possibility is an arrangement of the sacrificial elements 7 in the respective injection molding tool prior to the production of the clamp parts 3 themselves. In this case, the sacrificial elements 7 represent the disposable cores in the respective injection molding tool that can be carried along during the demolding operation of the clamp parts 3. At the same time, the sacrificial elements 7 can have suitable, preferably lateral, undercut areas (not illustrated) that enable the sacrificial elements 7 to be partially encapsulated with the synthetic plastic material or another clamp material.

The clamp 1 can also be configured as one piece in the sense of a single clamp part 3. The wrap angle of the receiving space 5 about the structural member 2 that is to be secured is preferably greater than 180°. It may also be advantageous to connect two clamp parts 3 by hinges, in particular, an integral hinge, so that then a one-piece clamp 1 (not illustrated) can be configured in total. Instead of the described hot melt adhesive, another alternative is a special adhesive that has a tear-off strip and that is formulated especially for polypropylene with a low energetic surface in interaction with the zinc surface.

While various embodiments have been chosen to illustrate the invention, it will be understood by those skilled in the art that various changes and modifications can be made therein without departing from the scope of the invention as defined in the appended claims.

What is claimed is:

1. A clamp for securing structural components, comprising:
   a first clamp part of plastic material having an outer contour at least partially defining a receiving space for receiving a structural component, said outer contour including a chamber-shaped cutout area; and
   a sacrificial element placed as an independent component on said outer contour of said clamp part and being visibly consumed upon onset of crevice corrosion at the structural component and continuing during use of the clamp to minimize corrosion at the structural component and on said clamp part, said sacrificial element being received in said cutout area.

2. A clamp according to claim 1 wherein
   said sacrificial element comprises an electrode.

3. A clamp according to claim 2 wherein
   said electrode is a sacrificial anode.

4. A clamp according to claim 2 wherein
   said sacrificial element comprises a projecting length extending from said cutout area.

5. A clamp according to claim 1 wherein
   said sacrificial element comprises at least one of magnesium and zinc constituents.

6. A clamp according to claim 1 wherein
   said sacrificial element consists essentially of one of magnesium and zinc.

7. A clamp according to claim 1 wherein
   said sacrificial element is securely connected to said clamp part by an adhesive bond.

8. A clamp according to claim 1 wherein
   said adhesive bond comprises a hot melt adhesive.

9. A clamp according to claim 1 wherein
   a second clamp part of plastic material essentially identical to said first clamp part is connected to said first clamp part, said clamp parts being block-shaped and delimiting said receiving space.

10. A clamp according to claim 9 wherein
    said clamp parts are injection molded of plastic material and comprise passage points lying outside of said receiving space and receiving fastening elements joining and clamping said clamp parts together.

11. A clamp according to claim 10 wherein
    said fastening elements are screws.

12. A clamp for securing structural components, comprising:
    a first clamp part of plastic material having an outer contour at least partially defining a receiving space for receiving a structural component and a cup-shaped depression; and
    a sacrificial element placed as an independent component on said outer contour of said clamp part and being visibly consumed upon onset of crevice corrosion at the structural component and continuing during use of the clamp to minimize corrosion at the structural component and on said clamp part, said cup-shaped depression receiving said sacrificial element, said sacrificial element being molded from a flat blank into a cup-shaped contour conforming to said depression in said clamp part.

13. A clamp according to claim 12 wherein
    said sacrificial element comprises an electrode.

14. A clamp according to claim 13 wherein said electrode is a sacrificial anode.

15. A clamp according to claim 12 wherein said sacrificial element comprises an edge conforming to a side of said clamp part without a projecting length.

16. A clamp according to claim 15 wherein said sacrificial element completely lines said depression in said clamp part.

17. A clamp according to claim 12 wherein said sacrificial element comprises at least one of magnesium and zinc constituents.

18. A clamp according to claim 12 wherein said sacrificial element consists essentially of one of magnesium and zinc.

19. A clamp according to claim 12 wherein said sacrificial element is securely connected to said clamp part by an adhesive bond.

20. A clamp according to claim 19 wherein said adhesive bond comprises a hot melt adhesive.

21. A clamp according to claim 12 wherein a second clamp part of plastic material essentially identical to said first clamp part is connected to said first clamp part, said clamp parts being block-shaped and delimiting said receiving space.

22. A clamp according to claim 21 wherein said clamp parts are injection molded of plastic material and comprise passage points lying outside of said receiving space and receiving fastening elements joining and clamping said clamp parts together.

23. A clamp according to claim 22 wherein said depression in each of said clamp parts is semi-cylindrical receiving a semi-cylindrical member forming said sacrificial element.

24. A clamp according to claim 22 wherein said depression in each of said claim part is semi-cylindrical with a plurality of radially extending ribs defining radial chambers therebetween; and
said sacrificial element comprises flat plate members extending radially in said chambers.

25. A clamp for securing structural components, comprising:
a first clamp part of plastic material having an outer contour at least partially defining a receiving space for receiving a structural component;
a second clamp part of plastic material essentially identical to said first clamp part and connected to said first clamp part, said clamp parts being block-shaped and delimiting said receiving space; and
a sacrificial element placed as an independent component on said outer contour of said clamp part and being visibly consumed upon onset of crevice corrosion at the structural component and continuing during use of the clamp to minimize corrosion at the structural component and on said clamp part.

26. A clamp according to claim 25 wherein said sacrificial element comprises an electrode.

27. A clamp according to claim 25 wherein said electrode is a sacrificial anode.

28. A clamp according to claim 25 wherein said sacrificial element comprises at least one of magnesium and zinc constituents.

29. A clamp according to claim 25 wherein said sacrificial element consists essentially of one of magnesium and zinc.

30. A clamp according to claim 25 wherein said clamp parts are injection molded of plastic material and comprise passage points lying outside of said receiving space and receiving fastening elements joining and clamping said clamp parts together.

31. A clamp according to claim 30 wherein said fastening elements are screws.

32. A clamp according to claim 30 wherein said depression in each of said clamp parts is semi-cylindrical receiving a semi-cylindrical member forming said sacrificial element.

33. A clamp according to claim 30 wherein said depression in each of said claim part is semi-cylindrical with a plurality of radially extending ribs defining radial chambers therebetween; and
said sacrificial element comprises flat plate members extending radially in said chambers.

* * * * *